United States Patent
Bauco et al.

(10) Patent No.: US 10,338,317 B2
(45) Date of Patent: Jul. 2, 2019

(54) SYSTEMS AND METHODS FOR TRACEABLE CABLES

(71) Applicant: CORNING OPTICAL COMMUNICATIONS LLC, Hickory, NC (US)

(72) Inventors: Anthony Sebastian Bauco, Horseheads, NY (US); Douglas Llewellyn Butler, Painted Post, NY (US); Micah Colen Isenhour, Lincolnton, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/868,041

(22) Filed: Jan. 11, 2018

(65) Prior Publication Data
US 2018/0136398 A1    May 17, 2018

Related U.S. Application Data

(63) Continuation of application No. PCT/US2016/042414, filed on Jul. 15, 2016.
(Continued)

(51) Int. Cl.
G02B 6/28    (2006.01)
F21V 8/00    (2006.01)
(Continued)

(52) U.S. Cl.
CPC .......... *G02B 6/2852* (2013.01); *G02B 6/001* (2013.01); *G02B 6/0006* (2013.01); *G02B 6/02319* (2013.01); *G02B 6/3873* (2013.01)

(58) Field of Classification Search
CPC .... G02B 6/2852; G02B 6/0006; G02B 6/001; G02B 6/02319; G02B 6/3873
See application file for complete search history.

(56) References Cited

U.S. PATENT DOCUMENTS

| | | |
|---|---|---|
| 3,942,859 A | 3/1976 | Korodi |
| 4,412,936 A | 11/1983 | Khmelkov et al. |

(Continued)

FOREIGN PATENT DOCUMENTS

| | | |
|---|---|---|
| CN | 200941319 Y | 8/2007 |
| CN | 201419706 Y | 3/2010 |

(Continued)

OTHER PUBLICATIONS http://www.dexim.net/list.php?id=7, Dexim product reference, downloaded from the web Feb. 24, 2016. 2 pages.
(Continued)

*Primary Examiner* — Daniel Petkovsek
(74) *Attorney, Agent, or Firm* — Adam R. Weeks

(57) ABSTRACT

A traceable cable includes at least one data transmission element, a jacket at least partially surrounding the at least one data transmission element, and a tracing optical fiber incorporated with and extending along at least a portion of a length of the cable. The tracing optical fiber includes a core having a first index of refraction and a cladding having a second index of refraction. The traceable cable also includes at least one launch point provided through at least a portion of the jacket for optically accessing the tracing optical fiber. The launch point includes an optical medium accessible from an exterior of the jacket and in contact with the tracing optical fiber, wherein the optical medium is substantially index-matched to the core of the tracing optical fiber. Related systems and methods are also disclosed.

16 Claims, 8 Drawing Sheets

Related U.S. Application Data

(60) Provisional application No. 62/221,769, filed on Sep. 22, 2015, provisional application No. 62/193,638, filed on Jul. 17, 2015.

(51) Int. Cl.
*G02B 6/02* (2006.01)
*G02B 6/38* (2006.01)

(56) References Cited

U.S. PATENT DOCUMENTS

| | | |
|---|---|---|
| 4,466,697 A | 8/1984 | Daniel |
| 4,557,552 A | 12/1985 | Newton et al. |
| 4,637,686 A | 1/1987 | Iwamoto et al. |
| 4,712,858 A * | 12/1987 | Presby ............... G02B 6/2552 264/1.27 |
| 4,755,018 A | 7/1988 | Heng et al. |
| 4,763,984 A | 8/1988 | Awai et al. |
| 4,923,274 A | 5/1990 | Dean |
| 4,995,691 A | 2/1991 | Purcell, Jr. |
| 5,006,806 A | 4/1991 | Rippingale et al. |
| 5,017,873 A | 5/1991 | Rippingale et al. |
| 5,040,867 A | 8/1991 | de Jong et al. |
| 5,122,750 A | 6/1992 | Rippingale et al. |
| 5,179,611 A | 1/1993 | Umeda et al. |
| 5,206,065 A | 4/1993 | Rippingale et al. |
| 5,305,405 A | 4/1994 | Emmons et al. |
| 5,329,348 A | 7/1994 | Nimura et al. |
| 5,333,228 A | 7/1994 | Kingstone |
| 5,377,292 A | 12/1994 | Bartling et al. |
| 5,394,496 A | 2/1995 | Caldwell et al. |
| 5,395,362 A | 3/1995 | Sacharoff et al. |
| 5,432,876 A | 7/1995 | Appledorn et al. |
| 5,463,706 A | 10/1995 | Dumont et al. |
| 5,500,913 A | 3/1996 | Allen et al. |
| 5,591,160 A | 1/1997 | Reynard |
| 5,666,453 A | 9/1997 | Dannenmann |
| 5,741,152 A | 4/1998 | Boutros |
| 5,764,043 A | 6/1998 | Czosnowski et al. |
| 5,835,654 A | 11/1998 | Bergmann |
| 5,979,188 A | 11/1999 | Ojha |
| 5,982,967 A | 11/1999 | Mathis et al. |
| 6,126,325 A | 10/2000 | Yamane et al. |
| 6,137,928 A | 10/2000 | Albrecht |
| 6,137,935 A | 10/2000 | Bohme et al. |
| 6,173,097 B1 | 1/2001 | Throckmorton et al. |
| 6,257,750 B1 | 7/2001 | Strasser et al. |
| 6,293,081 B1 | 9/2001 | Grulick et al. |
| 6,301,418 B1 | 10/2001 | Freier et al. |
| 6,311,000 B1 | 10/2001 | Schneider |
| 6,314,713 B1 | 11/2001 | Fitz et al. |
| 6,317,553 B1 | 11/2001 | Harper, Jr. et al. |
| 6,347,172 B1 | 2/2002 | Keller et al. |
| 6,356,690 B1 | 3/2002 | McAlpine et al. |
| 6,379,054 B2 | 4/2002 | Throckmorton et al. |
| 6,388,194 B1 | 5/2002 | Ryeczek |
| 6,403,947 B1 | 6/2002 | Hoyt et al. |
| 6,425,694 B1 | 7/2002 | Szilagyi et al. |
| 6,439,780 B1 | 8/2002 | Mudd et al. |
| 6,456,768 B1 | 9/2002 | Boncek et al. |
| 6,456,785 B1 | 9/2002 | Evans |
| 6,471,412 B1 | 10/2002 | Belenkiy et al. |
| 6,519,396 B2 | 2/2003 | Schneider et al. |
| 6,526,200 B1 | 2/2003 | Davie |
| 6,532,328 B1 | 3/2003 | Kline |
| 6,554,485 B1 | 4/2003 | Beatty et al. |
| 6,560,390 B2 | 5/2003 | Grulick et al. |
| 6,577,243 B1 | 6/2003 | Dannenmann et al. |
| 6,596,943 B1 | 7/2003 | Ward |
| 6,606,431 B2 | 8/2003 | Unsworth |
| 6,678,449 B2 | 1/2004 | Thompson et al. |
| 6,695,491 B1 | 2/2004 | Leeman et al. |
| 6,704,479 B2 * | 3/2004 | Koplow ............... G02B 6/4214 372/6 |
| 6,710,254 B2 | 3/2004 | Yueh |
| 6,712,524 B2 | 3/2004 | Beatty et al. |
| 6,728,453 B2 | 4/2004 | Petryszak |
| 6,798,956 B2 | 9/2004 | Morrison |
| 6,816,661 B1 | 11/2004 | Barnes et al. |
| 6,823,120 B2 | 11/2004 | Hurley et al. |
| 6,906,505 B2 | 6/2005 | Brunet et al. |
| 6,933,438 B1 | 8/2005 | Watts et al. |
| 6,969,273 B2 | 11/2005 | Chen |
| 6,979,223 B2 | 12/2005 | Chen |
| 7,020,369 B2 | 3/2006 | Lodge, Jr. et al. |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,090,411 B2 | 8/2006 | Brown |
| 7,121,707 B2 | 10/2006 | Currie et al. |
| 7,164,819 B2 | 1/2007 | Jenson et al. |
| 7,217,152 B1 | 5/2007 | Xin et al. |
| 7,221,284 B2 | 5/2007 | Scherer et al. |
| 7,242,831 B2 | 7/2007 | Fee |
| 7,313,304 B2 | 12/2007 | Andrews et al. |
| 7,401,961 B2 | 7/2008 | Longatti et al. |
| 7,406,231 B1 | 7/2008 | Beck et al. |
| 7,433,565 B2 | 10/2008 | Joseph et al. |
| 7,524,082 B2 | 4/2009 | North |
| 7,544,909 B2 | 6/2009 | Dhir |
| 7,572,066 B2 | 8/2009 | De Jong et al. |
| 7,596,293 B2 | 9/2009 | Isenhour et al. |
| 7,603,020 B1 | 10/2009 | Wakileh et al. |
| 7,618,175 B1 | 11/2009 | Hulse |
| 7,620,279 B2 | 11/2009 | Joseph |
| 7,653,277 B2 | 1/2010 | Andrews et al. |
| 7,671,279 B2 | 3/2010 | Yin |
| 7,748,860 B2 | 7/2010 | Brunet |
| 7,817,884 B2 | 10/2010 | Demeritt et al. |
| 7,920,764 B2 * | 4/2011 | Kewitsch ............... G02B 6/447 340/572.7 |
| 7,932,805 B2 | 4/2011 | Darr et al. |
| 7,948,226 B2 | 5/2011 | Rathbun, II et al. |
| 8,000,576 B2 | 8/2011 | Chen et al. |
| 8,102,169 B2 | 1/2012 | Law et al. |
| 8,150,227 B2 | 4/2012 | Kewitsch |
| 8,152,385 B2 | 4/2012 | De Jong et al. |
| 8,167,471 B1 | 5/2012 | Moritz |
| 8,314,603 B2 | 11/2012 | Russell |
| 8,322,871 B1 | 12/2012 | Knaggs et al. |
| 8,331,752 B2 | 12/2012 | Biribuze et al. |
| 8,408,029 B2 | 4/2013 | De Angelis et al. |
| 8,414,319 B2 | 4/2013 | Patel et al. |
| 8,428,405 B2 | 4/2013 | Kewitsch |
| 8,492,448 B2 | 7/2013 | Dewa et al. |
| 8,509,579 B2 | 8/2013 | Martin-Lopez |
| 8,545,076 B2 | 10/2013 | Bickham et al. |
| 8,548,293 B2 | 10/2013 | Kachmar |
| 8,582,939 B2 | 11/2013 | Gimblet et al. |
| 8,582,940 B2 | 11/2013 | Abernathy et al. |
| 8,591,087 B2 | 11/2013 | Bickham et al. |
| 8,620,123 B2 | 12/2013 | Dean, Jr. et al. |
| 8,620,125 B2 | 12/2013 | Button et al. |
| 8,683,827 B2 | 4/2014 | De Angelis et al. |
| 8,708,724 B2 | 4/2014 | Patel et al. |
| 8,724,942 B2 | 5/2014 | Logunov et al. |
| 8,770,525 B2 | 7/2014 | Donaldson et al. |
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |

(56) References Cited

U.S. PATENT DOCUMENTS

| | | |
|---|---|---|
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2* | 8/2016 | Bookbinder ......... G02B 6/4482 |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,571,694 B2 | 2/2017 | Hirao |
| 9,671,551 B2 | 6/2017 | Dean, Jr. et al. |
| 9,709,750 B1 | 7/2017 | Kuang et al. |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1* | 8/2013 | Dean, Jr. ............ G02B 6/02033 385/113 |
| 2013/0272014 A1 | 10/2013 | Logunov et al. |
| 2013/0279202 A1* | 10/2013 | Frankiewicz ........ G02B 6/0001 362/618 |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1* | 10/2016 | Chomycz ............... G02B 6/447 |
| 2016/0313513 A1 | 10/2016 | Wijbrans et al. |
| 2016/0341922 A1 | 11/2016 | Bauco et al. |
| 2016/0377818 A1 | 12/2016 | Tong et al. |
| 2017/0123167 A1 | 5/2017 | Isenhour et al. |
| 2017/0207585 A1 | 7/2017 | Butler et al. |
| 2017/0293102 A1 | 10/2017 | Bauco et al. |
| 2017/0315318 A1 | 11/2017 | Modavis |
| 2018/0128996 A1 | 5/2018 | Sawicki et al. |
| 2018/0136399 A1* | 5/2018 | Bauco ................. G02B 6/4482 |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A | 5/2011 |
| WO | 2013055842 A1 | 4/2013 |
| WO | 2013059811 A1 | 4/2013 |

(56) References Cited

FOREIGN PATENT DOCUMENTS

| | | |
|---|---|---|
| WO | 2013122825 A1 | 8/2013 |
| WO | 2014026300 A1 | 2/2014 |
| WO | 2015000194 A1 | 1/2015 |

OTHER PUBLICATIONS

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.

Fiber Optic Products, Inc., "Specifications of our Fiber and Cable," n.d. Retrieved on Aug. 9, 2013, 2 pages.

M. Rajesh, "Polymer Photonics: An Overview," Fabrication and Characterisation, 2011, 38 pages.

Schott, "SpectraStream Glass Harnesses," Rev. 11/06, 2 pages.

Spigulis, J., "Side-Emitting Fibers Brighten Our World in New Ways," Oct. 2005, Retrieved from www.osa-opn.org, 6 pages.

"Super Vision Fiber Optics Side Glow Cables, " TriN01ihLighting. com, Tri North Lighting, Inc., n.d., Web. Aug. 1, 2013.

"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.

Lu et al. Optical fiber with nanostructured cladding ofTiO2 nanoparticles self-assembled onto a side polished fiber and its temperature sensing, Optics Express, vol. 22. No. 26, Dec. 29, 2014, 7 pages, downloaded from internet on Jan. 5, 2015.

"Side Emitting Super Glowing Fiber," MeshTel.com. MeshTel-INTELITE, Inc., 1996-2012. Web. Aug. 1, 2013.

Endruweit et al. "Spectroscopic experiments regarding the efficiency of side emission optical fibres in the UV-A and visible blue spectrum", Optics and Lasers Engineering 46 (2008) pp. 97-105.

U.S. Appl. No. 62/193,638 "Systens and Methods for Traceable Cables", filed Jul. 17, 2015. 27 Pgs.

U.S. Appl. No. 62/193,643 "Systems and Methods for Tracing Cables and Cables for Such Systems and Methods", filed Jul. 17, 2015. 33 Pgs.

\* cited by examiner

SYSTEMS AND METHODS FOR TRACEABLE CABLES

PRIORITY APPLICATIONS

This application is a continuation of International Application No. PCT/US16/42414, filed on Jul. 15, 2016, which claims the benefit of priority to U.S. Provisional Application No. 62/221,769, filed Sep. 22, 2015, and U.S. Provisional Application Ser. No. 62/193,638, filed Jul. 17, 2015, the content of each of which is relied upon and incorporated herein by reference in entirety.

BACKGROUND

This disclosure generally relates to cables and cable assemblies, such as telecommunication patch cords, that are traceable due to the addition of a tracing optical fiber that emits light for visualization purposes. More particularly, this disclosure relates to systems and methods of providing tracer light to the tracing optical fiber(s) of the cables or cable assemblies.

Computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade, or other moves and changes. To ensure the continued proper operation of each network, the maze of cables connecting the individual components must be precisely understood and properly connected between specific ports.

In many cases, a data center's cables, often called patch cords, are required to bridge several meters across the data center. The cables may begin in one equipment rack, run through the floor or other conduit, and terminate at a component in a second equipment rack.

As a result, there is a need for an improved system that allows a select cable to be quickly and easily traceable for the purpose of identifying the path and/or approximate terminal end of a given cable that is being replaced, relocated, or tested. Particularly, there is a need for a system that is able to effectively couple light from an external source into the cable to facilitate tracing.

SUMMARY

The present disclosure includes various embodiments of traceable cables. According to one embodiment, a traceable cable includes at least one data transmission element, a jacket at least partially surrounding the at least one data transmission element, and a tracing optical fiber incorporated with and extending along at least a portion of a length of the traceable cable. The tracing optical fiber includes a core having a first index of refraction and a cladding with a second index of refraction. At least one launch point is provided through at least a portion of the jacket for optically accessing the tracing optical fiber. The launch point comprises an optical medium accessible from an exterior of the jacket and in contact with the tracing optical fiber, wherein the optical medium is substantially index-matched to the core of the tracing optical fiber.

The present disclosure also includes systems having traceable cables. One embodiment of a system includes a traceable cable and a launch tool. The traceable cable includes at least one data transmission element, a jacket at least partially surrounding the at least one data transmission element, and a tracing optical fiber incorporated with and extending along at least a portion of a length of the traceable cable. The traceable cable also comprises at least one launch point provided through at least a portion of the jacket for optically accessing the tracing optical fiber. The launch point comprises an optical medium accessible from an exterior of the jacket and in contact with the tracing optical fiber, wherein the optical medium is substantially index-matched to the core of the tracing optical fiber. The launch tool includes a light source and a delivery waveguide, with the light source being configured to couple light into a terminal end of the delivery waveguide. The delivery waveguide has an opposite terminal end for delivering the light from the light source to one of the launch points.

The present disclosure further includes methods of forming a traceable cable. One example method involves providing a cable that has at least one data transmission element, a jacket at least partially surrounding the at least one data transmission element, and a tracing optical fiber embedded with the jacket and extending along a length of the cable. The tracing optical fiber has a core and a cladding, wherein the core has an endface. The method further involves sliding a sleeve over the cable, the sleeve having at least one aperture therethrough. The aperture of the sleeve is aligned to be centered over the tracing optical fiber, and the sleeve is affixed to the cable. A portion of the jacket that is located within the aperture of the sleeve is removed. The removed portion of the jacket is then replaced with a clear material, the clear material being index-matched with the core of the tracing optical fiber.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to systems, and subsystems thereof, for tracing cables and cable assemblies containing at least one tracing optical fiber. The description also relates to methods of forming and using the systems and subsystems described herein. More particularly, this disclosure provides various embodiments of devices for providing light into an optical fiber, for example a tracing optical fiber within a traceable cable.

Figure 1:
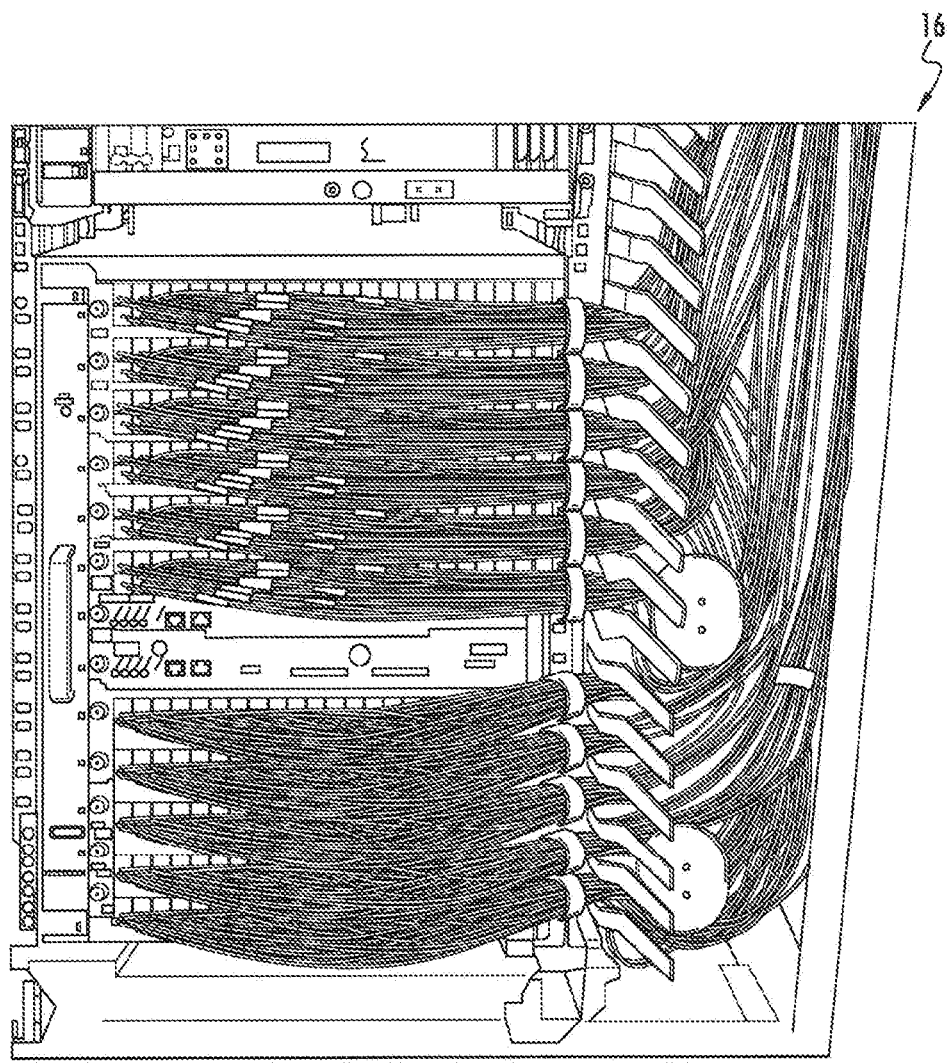
FIG. 1 is a perspective view of an equipment rack supporting patch cords.

A problem that occurs in data centers or similar network locations is congestion and clutter caused by large quantities of cables. FIG. 1 shows an example of congestion in an equipment rack 16. Network operators frequently desire to change connections to accommodate moves, adds, and changes in the network. However, such congestion makes it difficult to trace a particular cable from the source to the receiver, which may be required to perform the moves, adds, and changes in the network.

This disclosure provides various embodiments, components and subcomponents of a tracing system that allows for tracing operations performed on cables to be quickly and easily conducted by a single technician, resulting in a possible reduction of labor costs, down time, and errors. The tracing system makes the process of performing a trace or otherwise identifying a cable in a congested environment simple and fast for a technician. As a result, the technician can reliably identify the one cable in question (which may be a telecommunication patch cord) from amongst many other cables (which may also be telecommunication patch cords). In some cases, the service technician may be able to reliably identify the cable in question along its length once tracing capability at one end of the cable has been activated. The tracing system may also have the advantage of being an optically-activated tracing system using only passive tracing elements within the cable (although active tracing elements, such as light emitting diodes or the like, may still be provided on the cable assembly in addition to the passive tracing elements, if desired). As will be described in greater detail below, the act of tracing involves tracing a cable based upon an optical signal or stimulus, for example, a visible spot of light that is provided by a source external to the cables themselves. The source external to the cables may alternatively provide non-visible light for tracing purposes, with the tracing system including components to detect such non-visible light, as will be described in further detail below.

Figure 2:
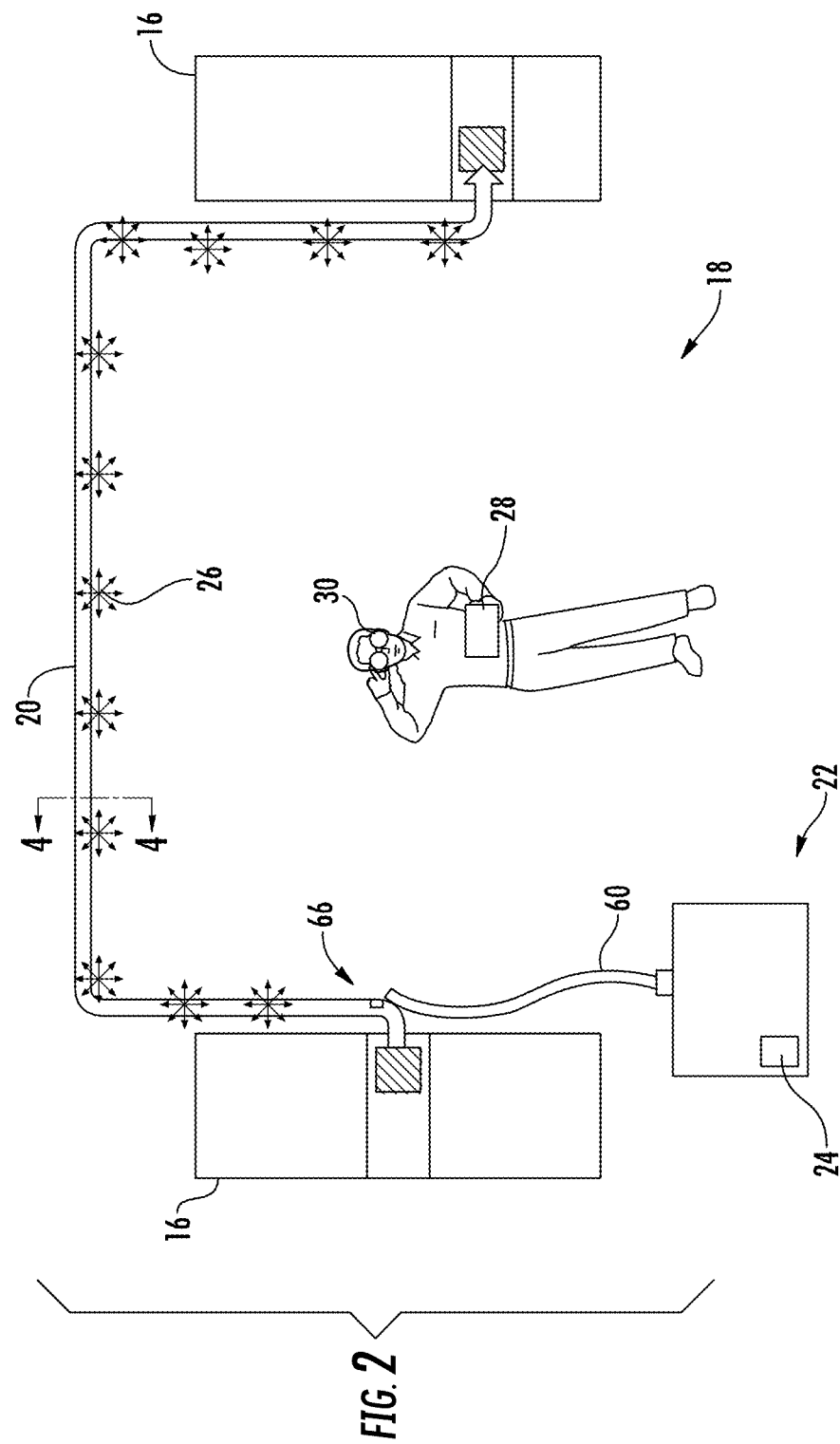
FIG. 2 is a schematic view of a system for tracing a cable including features of the present disclosure.

An example tracing system 18 is schematically illustrated in FIG. 2. The tracing system 18 includes a traceable cable 20 (hereinafter "cable 20") extending between two locations, such as two equipment racks 16 in a data center, telecommunications room, or the like. The cable 20 may, for example, operably connect a port on a server in one of the equipment racks 16 with a port on a server in another of the equipment racks 16.

The tracing system 18 also includes a launch tool 22 configured to connect to the cable 20 and provide tracer light from a light source 24. The tracer light may provide illumination at discrete points along the cable 20. Such discrete points are represented by element 26 in FIG. 2 and will be referred to herein as emission points 26 or tracer locations 26. In alternative embodiments, the cable 20 may be configured to provide more continuous emission along its length, or illumination only at or near ends of the cable 20.

The tracing system 18 may further comprise a controller 28 and an observation tool 30. The controller 28 in the embodiment shown is a remote control unit configured to communicate with the launch tool 22. A technician may, for example, use the controller 28 to send operational commands to the launch tool 22 to control operation of the light source 24. The observation tool 30 in the embodiment shown comprises a pair of glasses configured to enhance visibility of the tracer light emitted at the emission points 26. This may be achieved by enhancing visibility of the wavelength of the tracer light and/or by dampening other visible wavelengths. In embodiments where the tracer light has a non-visible wavelength, the observation tool 30 may include sensors configured to detect such light and electronics configured to display a representation of such light to a technician.

Figure 3:
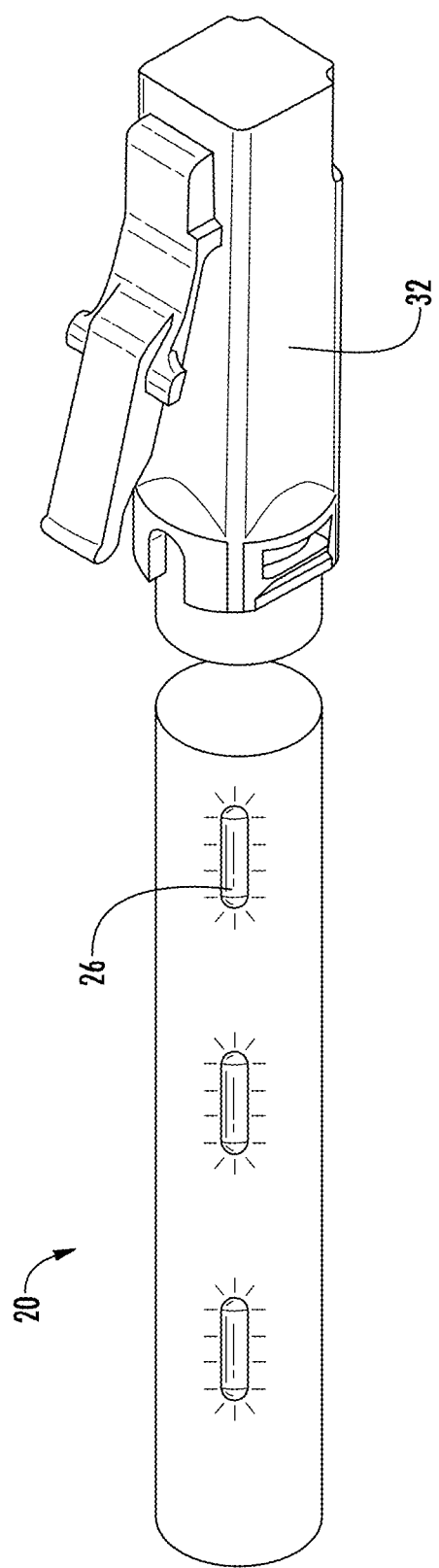
FIG. 3 is a side view, partially in cross-section, of a portion of a traceable cable assembly according to one embodiment.

FIG. 3 illustrates one embodiment of the cable 20 in slightly more detail. The cable 20 in this embodiment is part of a cable assembly that includes a connector 32 installed on an end of the cable 20. Although not shown, it should be understood that a similar or different connector may be present on an opposite end of the cable 20 to allow the cable assembly to act as a telecommunications patch cord between different components of a network. Additionally, it should be understood that the connector 32 may vary widely depending on the nature of the cable 20 (e.g., the quantity and type of signals transmitted) and the components being connected. The distance between the connectors 32 on opposite ends of the cable 20 may define a length L for the cable 20. The length L may be at least about 1 meter or even several tens of meters, such as thirty meters or more, depending on the intended use of the cable 20.

Figure 4:
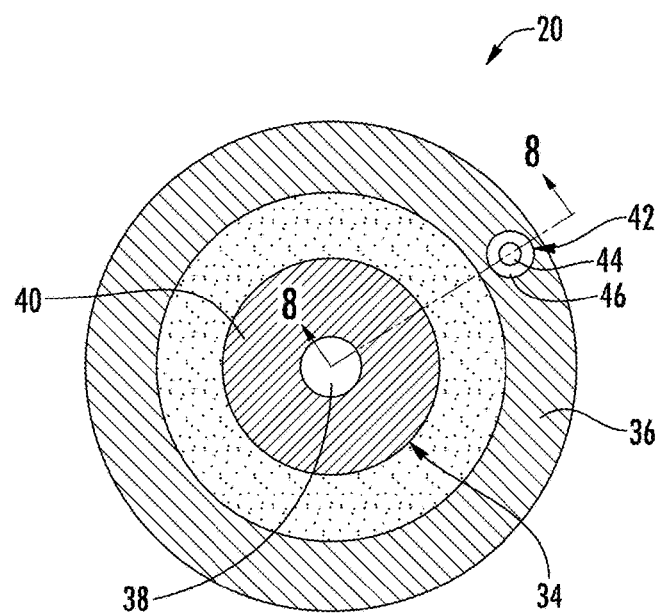
FIG. 4 is a transverse cross sectional view of one embodiment of a traceable cable for use with features of the present disclosure.

FIG. 4 is a cross section of the cable 20 to further represent one possible embodiment. As shown in FIG. 4, the cable 20 includes a data transmission element 34 and a jacket 36 surrounding the data transmission element 34. Although only one data transmission element is shown in this embodiment, there may be more than one data transmission element in other embodiments. In general, the data transmission element 34 is a structure capable of carrying a data signal from one end of the cable 20 to the other end of the cable 20. For example, the data transmission element 34 may be configured to transmit an electrical signal using a copper wire or other electrically conductive material. Alternatively, the data transmission element 34 may be configured to transmit an optical signal by conducting electromagnetic waves to carry data from one location to another. The data transmission element 34 shown in FIG. 4 is of the latter type (i.e., an optical transmission element) having a core 38 and a cladding 40. There may be strength members (e.g., aramid yarns) or other elements located within the cable 20 between the data transmission element 34 and the jacket 36.

In alternative embodiments, the cable 20 may be more appropriately referred to as a conduit, without having any data transmission elements. Instead of transmitting a data signal, these cables may transmit fluids such as air or liquid. These cables may be appropriate for use in a medical setting such as IV lines or oxygen tubing.

Still referring to FIG. 4, the cable 20 further includes at least one tracer element, which is shown in the form of a tracing optical fiber 42 (also referred to as a "tracer optical fiber 42") configured to transmit and emit tracer light for visualization purposes. The tracing optical fiber 42 may be incorporated as part of the cable 20 in several configurations. In the embodiment shown in FIG. 4, the tracing optical fiber 42 is embedded within a portion of the jacket 36. In other embodiments, the tracing optical fiber 42 may be adjacent to the data transmission element 34, inside a conduit defined by the jacket 36. In yet other embodiments, the tracing optical fiber 42 may be provided on, mounted to, or otherwise attached to an outside of the jacket 36.

The tracing optical fiber 42 includes a core 44 having a first index of refraction, and a cladding 46 at least partially surrounding the core 44. The cladding 46 has a second index of refraction different and lower than the first index of refraction. The tracing optical fiber 42 may be configured to emit light at ends of the tracing optical fiber 42 and/or along the length of the tracing optical fiber 42 in a continuous or periodic manner. The tracing optical fiber 42 may, for example, include features or otherwise be configured to scatter light at discrete locations along the length of the tracing optical fiber 42. Such periodic scattering of light may form the emission points 26 (FIG. 3) of the cable 20, alone or in combination with features on the jacket 36, such as openings/windows (not shown) in the jacket 36 or portions of reduced material thickness between the tracing optical fiber 42 and an outer surface of the jacket 36. The term "side-emitting optical fiber" may be used to refer to the tracing optical fiber 42 in embodiments where light is scattered along the length of the tracing optical fiber 42 in a periodic or continuous manner.

Figure 5:
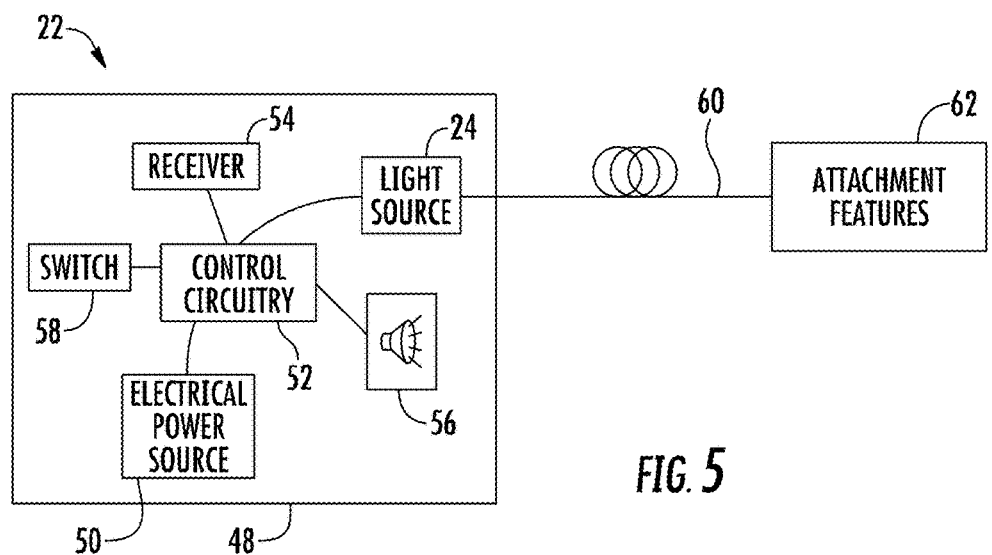
FIG. 5 is a schematic view of a launch tool according to one embodiment.

As mentioned above, the tracer light emitted by the tracing optical fiber 42 may be provided by the launch tool 22 (FIG. 2). An example of the launch tool 22 is schematically shown in FIG. 5. The launch tool 22 may have a number of elements stored in a housing 48, including the light source 24 (e.g., a red or green laser), an electrical power source 50 (e.g., batteries), and control circuitry 52 to control the light source 24 and power usage. A receiver 54 or other wireless communication components, such as a combination transmitter/receiver, may be also be included in or on the housing 48 to receive commands from the controller 28 (FIG. 3) and optionally transmit information back to the controller. Furthermore, a speaker 56 may be included to allow for the generation of audible signals. Audible signals may make recovery of the launch tool 22 easier in a crowded data center environment. The housing 48 may also include an on-off switch 58 and be designed approximately the size of a standard flashlight or smaller. The housing 48 should be sufficiently durable to protect the launch tool 22, even in the event of a drop onto a hard surface.

In one embodiment, the light source 24 may be a semiconductor laser emitting green light at a wavelength between 510-540 nm. Alternatively, other colors/wavelengths may be emitted, such as red light from approximately 620 to 650 nm. In other embodiments, non-laser light sources may be used, such as light emitting diodes (LEDs). Determining the light source 24 may involve consideration, evaluation, and testing of several factors, including visibility, cost, eye safety, peak power, power consumption, size, and commercial availability.

The launch tool 22 may include a delivery waveguide 60, sometimes referred to as an umbilical, that provides a path for tracer light to travel from the light source 24 to the tracing optical fiber 42 of the cable 20. The delivery waveguide 60 may include optional optics to help couple light from the light source 24 into the delivery waveguide 60 and/or optics to help couple light from the delivery waveguide 60 into the tracing optical fiber 42. The delivery waveguide 60 may be several meters in length so the housing 48 of the launch tool 22 can be placed on the ground while the end of the delivery waveguide 60 is coupled with the cable 20 several meters away.

Attachment features 62 may be provided at or near a terminal end 64 (FIG. 7) of the delivery waveguide 60 to secure the delivery waveguide 60 to the cable 20 and keep the terminal end 64 of the delivery waveguide 60 in a desired position for establishing and maintaining an optical connection with the tracing optical fiber 42. The attachment features 62 may, for example, include a clasping structure that holds the terminal end 64 of the delivery waveguide 60 in a precise spot along the cable 20 and at a correct angle so that tracer light can couple into the tracing optical fiber 42. The attachment features 62 may provide a secure connection so that the delivery waveguide 60 remains in optical communication with the tracing optical fiber 42 after the technician has stepped away (e.g., in search of the far end of the cable 20). In some embodiments, the attachment features 62 may form one portion of a two-part optical connector, as will be discussed further below.

The tracing optical fiber 42 receives light from the delivery waveguide 60 through a launch point 66 (see FIG. 2) to form an optical junction or connection between the launch tool 22 and the cable 20. Where emission points 26 are used, sufficient brightness along the full length of the tracing optical fiber 42 may be desired with the least amount of power for the light source 24. Therefore, the coupling efficiency of the optical junction may be important in some embodiments.

Figure 6:
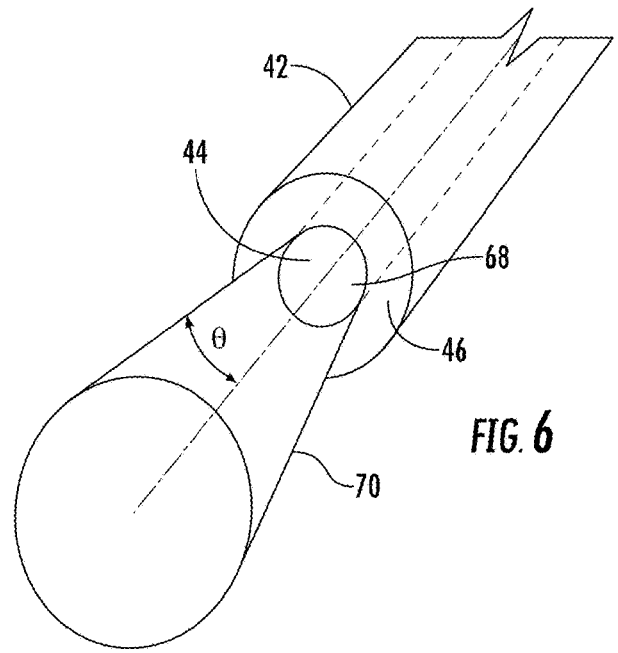
FIG. 6 is a schematic view illustrating the concept of acceptance cones for efficient optical coupling to an optical fiber.

The efficiency at which light is coupled from a source (e.g., the terminal end 64 of the delivery waveguide 60) to a receiver (e.g., an endface 68 of the tracing optical fiber 42) may be influenced by: (a) the acceptance half angle $\theta$ of the receiver (see FIG. 6); (b) the étendue of the source; (c) the cross-sectional area of the receiver and (d) the distance between the source and the receiver.

The acceptance half angle $\theta$ defines the boundary of an acceptance cone 70. For example, light approaching an endface 68 of the core 44 from an angle within the acceptance cone 70 will tend to couple into the core 44. Light that approaches from a steeper angle outside of the acceptance cone 70 will tend to transmit through the side of the core 44 and therefore may not be captured and transmitted down the core. For a typical plastic optical fiber (POF) with a 0.5 numerical aperture, the acceptance half angle $\theta$ is about thirty degrees. For a glass core optical fiber with a polymer cladding and a numerical aperture of 0.39, the acceptance half angle $\theta$ is about 23 degrees.

The étendue for a source of light may be considered as a measure of the divergence of light as it leaves the source and the cross-sectional area of the source. The étendue may be calculated as the product of the acceptance solid angle (i.e., two times $\theta$) of the source and the cross-sectional area of the source.

With this in mind, the delivery waveguide 60 is emitting light in the form of a cone that is spreading after the light leaves the delivery waveguide 60. Therefore, it may be desirable for a longitudinal axis A of the delivery waveguide 60 to form as small of an angle of attack α (see FIG. 7) with a longitudinal axis Z of the tracing optical fiber 42 as possible, and in any event should be less than the acceptance half angle θ of the tracing optical fiber 42. Further, it may be desirable for the terminal end 64 of the delivery waveguide 60 to be positioned as close as possible to an endface 68 of the tracing optical fiber 42 to maintain as much overlap between the acceptance cone 70 of the tracing optical fiber 42 and the emission cone (not shown) of the delivery waveguide 60. In some embodiments, the accuracy of placement along the longitudinal axis Z should be +/−70 microns. Described another way, the intersection of the longitudinal axis Z and the longitudinal axis A should closely correspond to the endface 68 of the tracing optical fiber 42. The depth of the tracing optical fiber 42 relative to the outer diameter of the cable 20 should also be accurately maintained within about +/−25 microns.

Each cable 20 may have one or more of the tracing optical fibers 42 spaced around the circumference of the jacket 36. In some embodiments, the delivery waveguide 60 may attach to the cable 20 in a position around a longitudinal axis Z' of the cable 20 that is adjacent to the tracing optical fiber 42. In the illustrated example of FIG. 7, the cable 20 is shown with the portion of the circumference of the cable 20 that contains the tracing optical fiber 42 facing upward. Therefore, the delivery waveguide 60 may be attached to the relative top of the cable 20 in the illustrated embodiment. Attachment may be provided with precision within +/−1 degree around the longitudinal axis Z' of the cable 20.

Figure 7:
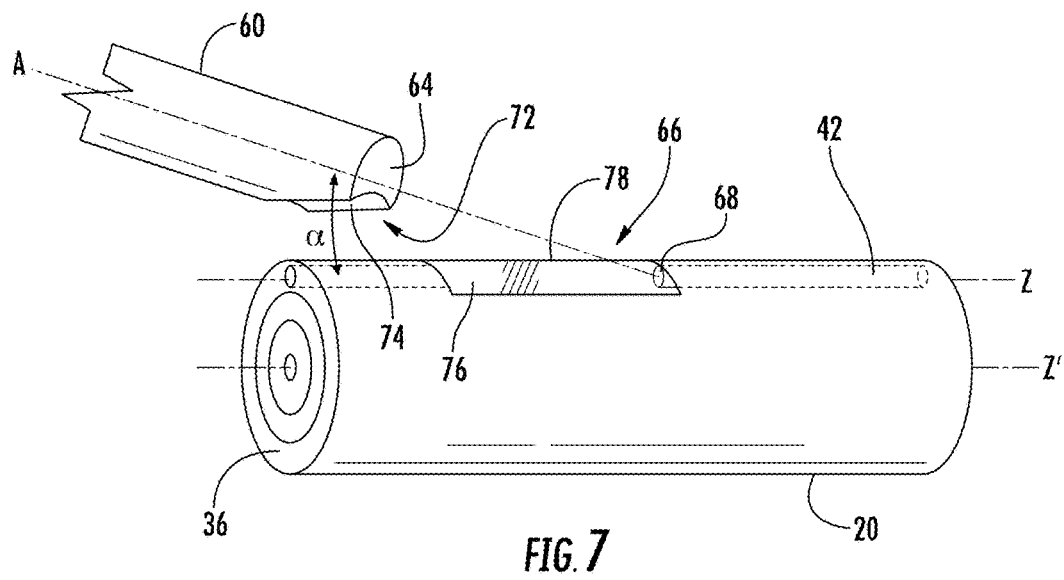
FIG. 7 is a schematic view illustrating one embodiment of an optical junction for the traceable cable of FIG. 4.

In the embodiment of FIG. 7, the terminal end 64 of the delivery waveguide 60 may be provided with a notch 72 to provide an emission surface 74. The notch 72 may extend from the terminal end 64 a short distance along the delivery waveguide 60, and at an angle with respect to the longitudinal axis A. The notch 72 may produce an emission surface 74 that is oblique to the longitudinal axis A. Because the emission surface 74 should face the launch point 66, the notch 72 renders the delivery waveguide 60 rotationally dependent. In other words, the rotational orientation of the delivery waveguide 60 around the longitudinal axis A becomes important to achieve the desired optical junction. To correspond to the illustrated orientation of the cable 20, the delivery waveguide 60 may be rotated around the longitudinal axis A until the notch 72 faces downward.

The ability to orient or rotate the notch 72 with respect to the longitudinal axis A may be provided by one of several features. In one embodiment, the delivery waveguide 60 may be of sufficient length such that the delivery waveguide 60 itself can be twisted as one end relative to an opposite end. In another embodiment, the delivery waveguide 60 may be attached to the housing 48 of the launch tool 22 by a swivel connector (not shown) to provide for rotation around the longitudinal axis A. The magnitude of rotation about the longitudinal axis A may be influenced by the number of tracing optical fibers 42 present in the cable 20. For example, if there are two tracing optical fibers 42 mounted in diametrically opposite locations around the longitudinal axis Z' of the cable 20, the delivery waveguide 60 may rotate +/−90 degrees. For three tracing optical fibers 42, the rotational capability may be +/−60 degrees, and so on.

Figure 8:
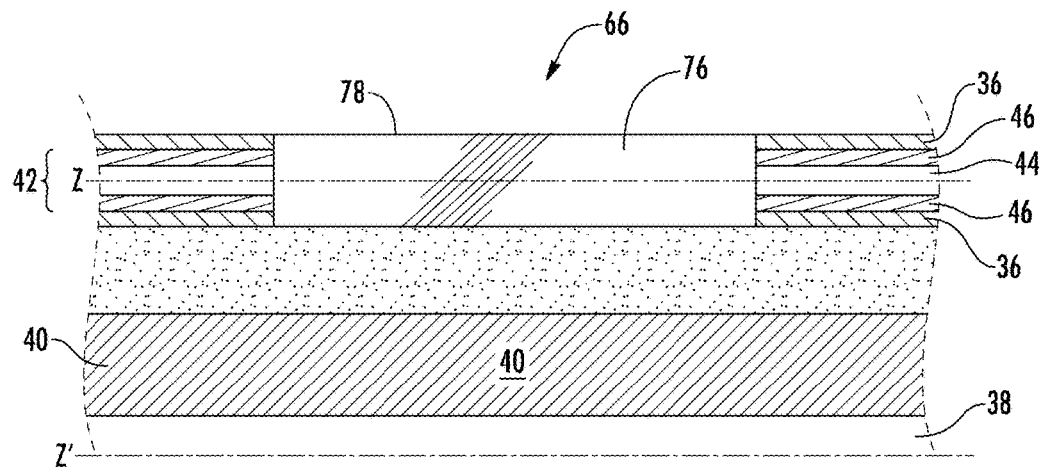
FIG. 8 is a partial cross sectional view taken along plane 8-8 in FIG. 4, wherein the cross section is through the optical junction shown in FIG. 7.

FIGS. 7 and 8 show an embodiment of an optical junction. Generally speaking, optical junctions described herein facilitate coupling light from an external source (i.e., the launch tool 22) to the tracing optical fiber 42 without requiring an end-to-end connection between the tracing optical fiber 42 and the external source. Instead, the cable 20 is provided with at least one launch point 66 through which tracer light is intended to reach the tracing optical fiber 42. The launch point 66 may comprise a segment of the cable 20 where a portion of the jacket 36 has been removed, leaving behind the endface 68 of the tracing optical fiber 42. The endface 68 may have been formed by cleaving the tracing optical fiber 42. The launch point 66 may then comprise a transparent material 76 or optical medium, such as PVC, to fill in the void caused by the removal of the jacket 36. The transparent material 76 should have the same or similar index of refraction, (i.e., be substantially index matched) as the core 44 of the tracing optical fiber 42. Use of a transparent material 76 with a substantially similar index of refraction helps minimize the effects of the boundary formed between the endface 68 and the optical medium in the launch point 66. A launch point 66 may be located proximate to each end of the cable 20. Each launch point 66 may, for example, be less than one meter from an adjacent connector 32 (FIG. 3), less than 0.5 meters from the adjacent connector 32, or even less than 0.1 meters from the adjacent connector 32 in some embodiments.

FIGS. 7 and 8 illustrate an entrance surface 78 of the optical medium as having a cylindrical curvature to match the outer surface of the jacket 36. The emission surface 74 of the delivery waveguide 60, as a result of the shape of the notch 72, may be provided with an opposite concave curvature to promote a close contact and efficient optical connection when the emission surface 74 is mated with the entrance surface 78.

Figure 9:
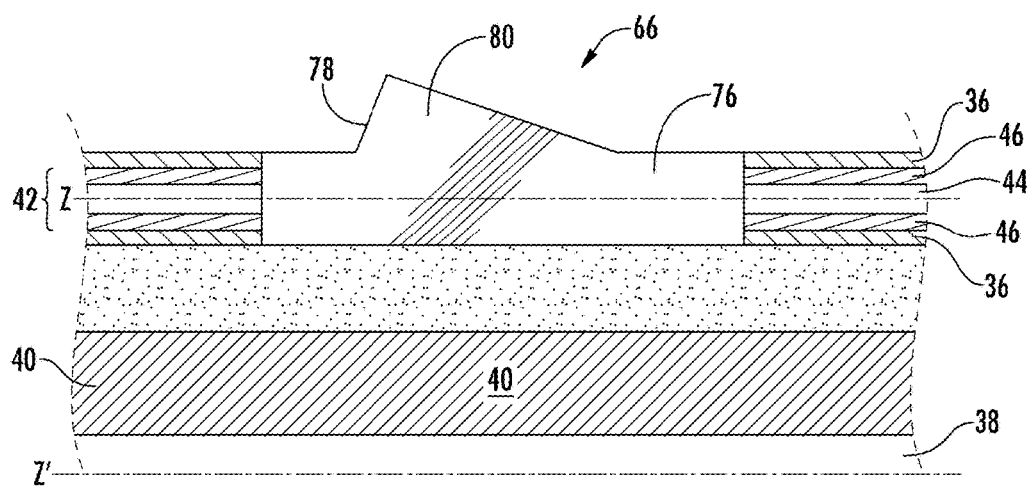
FIG. 9 is a partial cross sectional view of a traceable cable, wherein the cross-section is through an optical junction according to another embodiment.

FIG. 9 shows another embodiment where the exterior surface of the optical medium (i.e. transparent material 76) is molded with a projection 80 that provides the entrance surface 78. The projection 80 may allow the terminal end 64 of the delivery waveguide 60 to mate with the entrance surface 78 at the desired acceptance angle between the longitudinal axis A and the longitudinal axis Z without providing the terminal end 64 with the notch 72, in which case the terminal end 64 would provide the emission surface 74. Providing the emission surface 74 perpendicular to the longitudinal axis A may limit light loss that could otherwise occur when the emission surface 74 is at a shallow angle with respect to the longitudinal axis A.

Figure 10:
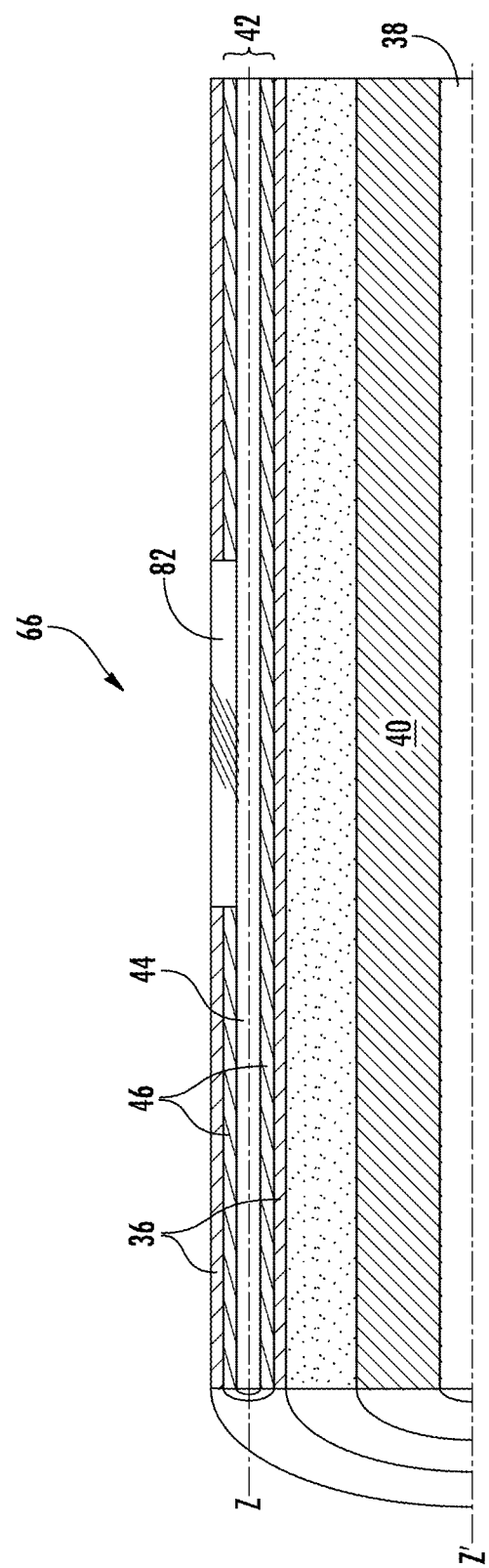
FIG. 10 is a partial cross sectional view of a traceable cable, wherein the cross-section is through an optical junction according to yet another embodiment.

FIG. 10 shows yet another embodiment of the launch point 66 created without cleaving or otherwise cutting through the tracing optical fiber 42. As shown, only the jacket 46 is removed from adjacent to the tracing optical fiber 42. The cladding 46 and any additional layers on the tracing optical fiber 42 are removed, exposing a portion of the core 44. In this embodiment, tracer light can enter the core 44 completely from a peripheral surface rather than from an endface of the tracing optical fiber 42. This embodiment may require an abrupt and precise demarcation between the exposed core portion and the remainder of the tracing optical fiber 42 that retains the cladding 46 used to keep light trapped within the core 44. Without the precise demarcation, light injected into the peripheral surface of the core 44 may tend to come right back out again, instead of being propagated along the length of the tracing optical fiber 42.

Figure 11:
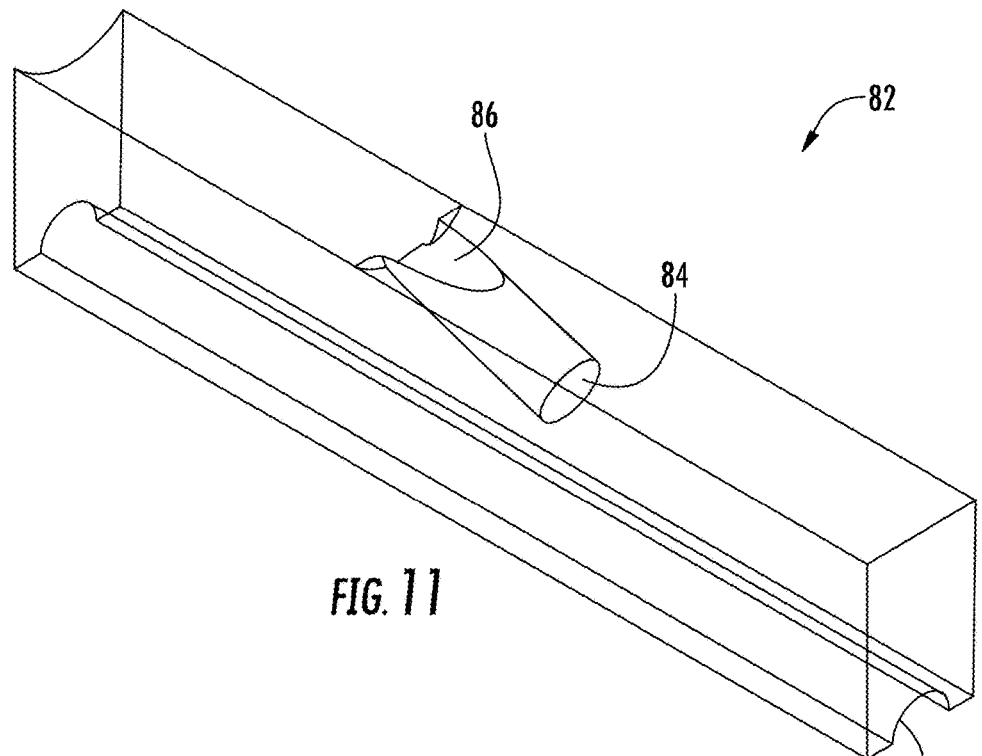
FIG. 11 is a perspective view of one embodiment of a spacer for use with embodiments of the present disclosure.

FIG. 11 shows a spacer 82 that may be used as the transparent index matched material, i.e. the optical medium in the embodiment of FIG. 10. The spacer 82 may be placed down onto the exposed surface of the core 44 to provide an optical pathway for tracer light from the delivery waveguide 60 to the periphery of the core 44. The spacer 82 may provide an optical abutment surface 84 for the delivery waveguide 60. In one embodiment, the optical abutment surface 84 is the floor of a blind hole 86 provided in the spacer 82. By providing the blind hole 86 at the appropriate angle, the emission surface 74 of the delivery waveguide 60 may be kept perpendicular to the waveguide axis A similar to the embodiment of FIG. 9. The spacer 82 may be pre-formed with a mating surface 88 having a curvature corresponding with the curvature of the core 44 of the tracing optical fiber 42. An index matched optical adhesive can be used between the spacer 82 and the core 44 to couple light from the spacer 82 through the interface into the core 44 of the tracing optical fiber 42.

Minimizing or eliminating air gaps between the delivery waveguide 60 and the launch point 66 can help avoid light loss due to high reflectance. One possible way to provide good optical mating may be to have an optically transparent, mechanically compliant material at the end of the delivery waveguide 60 that is pre-formed to match the contours of the launch point 66 but is also ductile to conform when the delivery waveguide 60 is brought into contact with the launch point 66.

Figure 12:
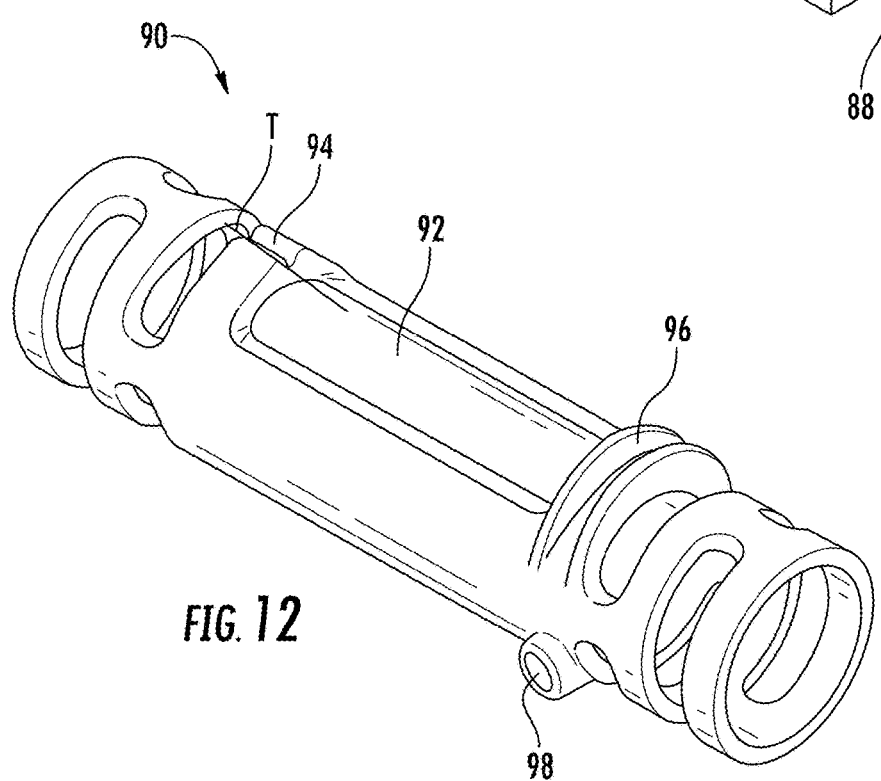
FIG. 12 is a perspective view of a sleeve for providing a connection at an optical junction of a traceable cable.

To help maintain a relative alignment within the optical junction, a two-part optical connector may be provided with a first portion associated with the cable 20 and a second portion (e.g., the attachment features 62) associated with the delivery waveguide 60. As shown in FIG. 12, the first connector portion may take the form of a low-profile sleeve 90. A goal of the low-profile sleeve 90 is to keep the total diameter as small as possible around the sleeve 90 to avoid snagging or taking up too much space in a confined area within an equipment rack 16. In one embodiment, the outer diameter of the sleeve 90 may be about 2 mm or less. By comparison, the outer diameter of the jacket 36 itself may be about 1.5 mm in such an embodiment.

The sleeve 90 may be installed around the cable 20, particularly around the jacket 36, and include an aperture 92 configured to be aligned with the launch point 66. For example, the sleeve 90 may be adhered to an exterior surface of the jacket 36. One or more alignment features may be provided on the sleeve 90 to assist with the desired positioning of the delivery waveguide 60 relative to the launch point 66. In the illustrated example, a v-notch 94 is shown that extends in the direction of the longitudinal axis Z to assist with axial alignment so that the longitudinal axis Z' of the cable 20 lines up with the longitudinal axis A of the delivery waveguide 60. The v-notch 94 may have a trough axis T that is parallel to the longitudinal axis Z of the tracing optical fiber 42. In other embodiments, the depth of the v-notch 94 may vary such that the trough axis T intersects the longitudinal axis Z of the tracing optical fiber 42. A sloped embodiment of the v-notch 94 may help provide a desired angle of attack a for the delivery waveguide 60 toward the tracing optical fiber 42.

The sleeve 90 illustrated in FIG. 12 also includes a groove 96 configured such that when the sleeve 90 is installed on the cable 20, the groove 96 extends along the circumferential direction of the cable 20 around the longitudinal axis Z'. The groove 96 may serve as an alignment feature to help facilitate proper positioning of the delivery waveguide 60 along the longitudinal axis Z' of the cable 20.

The second connector portion (e.g., the attachment features 62) may take the form of a clasping element attached to the delivery waveguide 60 for clasping onto the first connector portion (e.g., the sleeve 90). The clasping element may have mating features configured to engage the alignment features of the first connector portion to facilitate angular orientation around the longitudinal axis Z' of the cable 20 and proper alignment along the cable 20. The clasping element may lock the terminal end 64 of the delivery waveguide 60 in position for the duration of the tracing process and then be able to be removed. In one example, the bottom of the sleeve 90 may include a recess 98 where a resilient dimple from the second connector portion could be placed to allow the clasp to be held securely in place in the alignment features.

The second connector portion can be made in many different ways. One embodiment employs a strap attached to the top of the delivery waveguide 60, which would encircle both the delivery waveguide 60 and the cable 20. Once in place, the strap could be fastened tightly.

An example of a process for forming the launch point 66 within the cable 20 may include inserting the sleeve 90 onto each end of the cable 20, and then sliding the sleeve 90 to a predetermined distance from each end of the cable 20. At some point the sleeve 90 may be angularly aligned around the longitudinal axis Z' of the cable 20 so that the aperture 92 in the sleeve 90 is centered over the tracing optical fiber 42. Once aligned, the sleeve 90 may be affixed in place by adhesive or other means. The jacket 36 and tracing optical fiber 42 inside the launch point 66 may be cut away and removed using optional reference features in the sleeve 90 to guide the location of the cut. The cut-away or removed portion of the jacket 36 can be refilled or replaced with the clear, index-matched transparent material 76 or spacer 82. The exterior surface of the optical medium may then be molded or otherwise processed to provide the desired entrance surface 78 for mating with the delivery waveguide 60.

The above-described method is particularly suited for embodiments where the tracing optical fiber 42 comprises a plastic optical fiber (i.e., the core 44 comprises plastic). If the tracing optical fiber 42 comprises a glass core 44 and polymer cladding 46, formation of the launch point 66 may further require pulling the tracing optical fiber 42 out of the jacket 36 after a portion of the jacket 36 has been removed. The endface 68 of the tracing optical fiber 42 may be further processed by removing any cladding 46 or coating on a portion of the core 44 to expose that portion. Creating this small region of exposed core may increase the efficiency at which light is accepted into the core 44 and transmitted down the tracing optical fiber 42.

In another embodiment, the core 44 of the tracing optical fiber 42 may remain intact as shown in FIG. 10. A laser or other means may be used to ablate the jacket 36 and any outer layer along an underlying segment of the tracing optical fiber 42, such as a protective coating and the cladding 46. As a result, the core 44 does not have to be cut, and only a portion of the circumference of the tracing optical fiber 42 may be affected. This embodiment may require an abrupt and precise demarcation between the exposed core portion and the remainder of the tracing optical fiber 42 that retains the cladding 46 which keeps light trapped in the core 44. Without the precise demarcation, light injected into the peripheral surface of the core 44 may tend to come right back out again, instead of being propagated along the length of the tracing optical fiber 42.

Instead of filling a void in the jacket 36 with a liquid transparent material that is subsequently cured, the pre-formed spacer 82 may be inserted to form the launch point 66. The spacer 82 may be placed down onto the exposed peripheral surface of the core 44 to provide an optical pathway for tracer light from the delivery waveguide 60 to the core 44. An index-matched optical adhesive can be applied between the spacer 82 and the core 44 to couple light from the spacer 82, through the interface, and into the core 44.

Persons skilled in optical communications will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

The invention claimed is:

1. A traceable cable, comprising:
   at least one data transmission element;
   a jacket at least partially surrounding the at least one data transmission element;
   a tracing optical fiber incorporated with and extending along at least a portion of a length of the cable, wherein the tracing optical fiber includes a core having a first index of refraction and a cladding with a second index of refraction; and
   at least one launch point provided through at least a portion of the jacket for optically accessing the tracing optical fiber, the launch point comprising:
      an optical medium accessible from an exterior of the jacket and in contact with the tracing optical fiber, wherein the optical medium is index-matched to the core of the tracing optical fiber.

2. The traceable cable of claim 1, wherein the optical medium is positioned to couple light into a peripheral surface of the core of the tracing optical fiber.

3. The traceable cable of claim 1, wherein the optical medium is positioned to couple light into an endface of the tracing optical fiber.

4. The traceable cable of claim 1, wherein the optical medium is a spacer adhered to the core of the tracing optical fiber.

5. The traceable cable of claim 4, wherein the spacer comprises:
   a first mating surface attached to the core of the tracing optical fiber and a second mating surface configured to receive light from a delivery waveguide.

6. The traceable cable of claim 1, wherein the tracing optical fiber is embedded within the jacket.

7. The traceable cable of claim 6, wherein the optical medium fills a void within a portion of the jacket.

8. The traceable cable of claim 1, wherein the optical medium has a molded projection to provide an abutment for receiving light.

9. The traceable cable of claim 1, wherein the optical medium has a blind hole for providing an abutment for receiving light.

10. The traceable cable of claim 1, further comprising a sleeve positioned around the jacket, the sleeve having an aperture positioned proximate to the at least one end of the tracing optical fiber.

11. A system for tracing a cable, comprising:
    a traceable cable, comprising:
       at least one data transmission element;
       a jacket at least partially surrounding the at least one data transmission element;
       a tracing optical fiber incorporated with and extending along at least a portion of a length of the cable for tracing the cable, wherein the tracing optical fiber includes a core having a first index of refraction and a cladding with a second index of refraction; and
       at least one launch point provided through at least a portion of the jacket for optically accessing the tracing optical fiber, the launch point comprising:
          an optical medium accessible from an exterior of the jacket and in contact with the tracing optical fiber, wherein the optical medium is index-matched to the core of the tracing optical fiber; and
    a launch tool comprising a light source and delivery waveguide, the light source being configured to couple light into a terminal end of the delivery waveguide, and the delivery waveguide having an opposite terminal end for delivering the light from the light source to one of the launch points.

12. The system of claim 11, wherein coupling of the light is not end-to-end between the tracing optical fiber and the delivery waveguide.

13. The system of claim 11, further comprising a connector for securely positioning the delivery waveguide with respect to the optical medium, the connector comprising a first connector portion attached to the traceable cable adjacent to the optical medium and a second connector portion attached to the delivery waveguide.

14. The system of claim 13, wherein the first connector portion comprises a sleeve positioned around the traceable cable, the sleeve having an aperture positioned proximate to the optical medium.

15. The system of claim 14, wherein the sleeve further comprises a notch for facilitating a predetermined axial and rotational alignment of the traceable cable and the delivery waveguide.

16. The system of claim 14, wherein the sleeve further comprises a groove for facilitating a predetermined positioning of the delivery waveguide along a longitudinal axis of the tracing optical fiber.

* * * * *